Patented Apr. 17, 1923.

1,452,481

UNITED STATES PATENT OFFICE.

JAMES BADDILEY, JOSEPH BARON PAYMAN, AND ERNEST GRAHAM BAINBRIDGE, OF MANCHESTER, ENGLAND, ASSIGNORS TO BRITISH DYESTUFFS CORPORATION LIMITED, OF MANCHESTER, ENGLAND.

MANUFACTURE OF 1.4 NAPHTHOL SULPHONIC ACID.

No Drawing. Application filed July 27, 1922. Serial No. 577,984.

*To all whom it may concern:*

Be it known that we, JAMES BADDILEY, JOSEPH BARON PAYMAN, and ERNEST GRAHAM BAINBRIDGE, all residing at Blackley, Manchester, in the county of Lancashire, England, all subjects of the King of Great Britain and Ireland, have invented certain new and useful Improvements in the Manufacture of 1.4 Naphthol Sulphonic Acid, of which the following is a specification.

It is well known that the direct sulphonation of alpha naphthol by treatment with sulphuric acid or fuming sulphuric acid results in the production of mixtures of isomeric monosulpho acids, also accompanied by one or more disulpho acids.

It is also known that under certain conditions, alpha naphthol, upon treatment with either fuming sulphuric acid, chlorsulfonic or sulphuric anhydride as such, gives a mixture of two isomeric-alpha-naphthol-monosulpho acids and the separation of this mixture by the aid of the barium salt is also known.

In consequence of this formation of a mixture of sulpho acids the commercial manufacture of the valuable 1.4 naphthol sulphonic acid has hitherto been accomplished by the indirect route:—naphthalene→alpha-nitro-naphthalene→alpha-naphthylamine→alpha-naphthionic acid→1.4 naphthol sulphonic acid. In this process both the alpha-naphthylamine and the alpha-naphthionic acid require purification and the 1.4 naphthol sulphonic acid obtained is always mixed with the decomposition or oxidation products of the sulphites used in the conversion of the naphthionic acid into the naphthol sulphonic acid.

We have discovered that 1.4 naphthol sulphonic acid can be prepared in good yield and quality by the action of chlor-sulphonic acid on alpha-naphthol in the presence of a suitable solvent. This new process has the important technical advantage of leading to the desired sulphonic acid more directly and at the same time a much better yield of the 1.4 naphthol sulphonic acid is obtained. As a solvent we prefer to use tetrachlorethane but any solvent which is not affected by chlor-sulphonic acid in the presence of alpha-naphthol at the temperature of the sulphonation such as, for instance, benzene or nitro-benzene, can be used. In order to avoid the formation of impurities it is desirable to work at a low temperature; thus the alpha-naphthol, dissolved in the solvent chosen, is mixed with the chlor-sulphonic acid whilst maintaining the temperature below 10–30° C.

The following examples will serve to illustrate further the nature of the invention but the invention is not confined to the examples. The parts are by weight.

*Example I.*

In a suitable vessel fitted with a stirrer are placed 600 parts of tetrachlorethane and 144 parts of alpha-naphthol. The mixture is heated until the alpha-naphthol is in solution and then cooled until the temperature is below 10° C. While still cooling 128 parts of chlor-sulphonic acid are run in. The temperature is afterwards raised and maintained at 50° C. for 24 hours. After cooling, the mixture is diluted with water and neutralized with sodium carbonate. The solvent is then recovered in a separator and the aqueous solution containing the sodium salt of 1.4 naphthol sulphonic acid is ready for use in the preparation of dyestuffs.

If desired the substance can be isolated in solid form by evaporation, in which case a body of very high concentration (substantially free from inorganic impurities) can be obtained, in contrast to the product obtained from naphthionic acid by treatment with bisulphite.

For certain purposes it is desirable to remove a trace of an organic impurity (possibly an isomeric sulphonic acid) which should not exceed (when working under suitable conditions) one to two per cent. in amount; this can be done by adding a little barium chloride solution until a precipitate ceases to form and filtering the solution. As aforesaid the formation of impurities can be minimized by working at low temperatures, while at high temperatures there is a tendency for the impurities to be increased.

*Example II.*

144 parts of alpha-naphthol are suspended in 600 parts of tetrachlorethane and 127 parts of distilled chlorsulphonic acid added below 30° C. The temperature is then raised to 50° and maintained at 50° for 24 hours.

The product is then cooled and diluted with water and the tetrachlorethane separated by means of a suitable apparatus and washed. The liquor and washings are then neutralized with milk of lime. The "lime cake" is filtered off and the filtrate made distinctly alkaline with $Na_2CO_3$ boiled and again filtered. The solution is now ready for use without further treatment.

What we claim and desire to secure by Letters Patent is:—

1. The process of manufacture of 1.4-naphthol sulphonic acid by acting upon alpha-naphthol with chlor-sulphonic acid in the presence of a substantially inert solvent, substantially as described.

2. The process of manufacture of 1.4-naphthol sulphonic acid, by acting upon alpha-naphthol with chlor-sulphonic acid, using tetrachlor-ethane as solvent, substantially as described.

3. The process of manufacturing of 1.4-naphthol sulphonic acid by acting upon alpha-naphthol with chlor-sulphonic acid, in the presence of a substantially inert solvent, at a temperature of approximately 50° C.

4. The process of manufacture of 1.4-naphthol sulphonic acid comprising heating a mixture of tetrachlorethane and alpha-naphthol until the latter is in solution, and then cooling the mixture below 10° C. while adding chlor-sulphonic acid, raising subsequently the temperature to about 50° C. and maintaining it for about 24 hours, cooling, diluting the mixture and water, neutralizing with sodium carbonate and recovering the solvent.

5. The process of manufacture of 1.4-naphthol sulphonic acid comprising heating a mixture of tetrachlorethane and alpha-naphthol until the latter is in solution, and then cooling the mixture below 10° C. while adding chlor-sulphonic acid, raising subsequently the temperature to about 50° C. and maintaining it for about 24 hours, cooling, diluting the mixture with water, neutralizing with sodium carbonate, recovering the solvent, adding a little barium chloride solution until a precipitate ceases to form and filtering the solution.

6. The process of manufacture of 1.4-naphthol sulphonic acid, comprising heating 600 parts of tetrachlorethane and 144 parts of alpha-naphthol, until the latter is in solution and then cooling the mixture below 10° C. while adding 128 parts of chlorsulphonic acid, raising subsequently the temperature to about 50° C. and maintaining it for about 24 hours, cooling, diluting with water, neutralizing with sodium carbonate, recovering the solvent, isolating the substance in solid form by evaporation.

In testimony whereof we have signed our names to this specification.

JAMES BADDILEY.
JOSEPH BARON PAYMAN.
ERNEST GRAHAM BAINBRIDGE.